(12) United States Patent
Lawlor et al.

(10) Patent No.: US 8,591,155 B2
(45) Date of Patent: Nov. 26, 2013

(54) TRANSPORT SYSTEM FOR HEAVY-DUTY EQUIPMENT

(76) Inventors: Timothy Lawlor, Huntington, NY (US); Brian O'Connell, Brampton (GB)

( * ) Notice: Subject to any disclaimer, the term of this patent is extended or adjusted under 35 U.S.C. 154(b) by 48 days.

(21) Appl. No.: 13/360,893

(22) Filed: Jan. 30, 2012

(65) Prior Publication Data
US 2012/0148362 A1    Jun. 14, 2012

Related U.S. Application Data

(60) Provisional application No. 61/453,683, filed on Mar. 17, 2011.

(51) Int. Cl.
*B60P 7/08* (2006.01)

(52) U.S. Cl.
USPC .......................................................... 410/45

(58) Field of Classification Search
USPC .......... 410/2, 44, 45, 53; 180/24.02; 280/404, 280/491.2; 414/460
See application file for complete search history.

(56) References Cited

U.S. PATENT DOCUMENTS

| | | | |
|---|---|---|---|
| 4,253,536 A | 3/1981 | Braathen | |
| 4,335,898 A | 6/1982 | Orosz et al. | |
| 4,416,571 A | 11/1983 | Krause | |
| 4,417,841 A | 11/1983 | Chadwick | |
| 4,470,475 A | 9/1984 | Carlson | |
| 4,762,192 A | 8/1988 | Maxwell | |
| 5,167,190 A | 12/1992 | Galand | |
| 6,575,101 B2 | 6/2003 | Blute et al. | |
| 7,744,318 B2 * | 6/2010 | Wobben | 410/45 |
| 2002/0017088 A1 | 2/2002 | Dillon | |
| 2003/0111820 A1 | 6/2003 | Saieg et al. | |
| 2004/0135344 A1 | 7/2004 | Douglas | |
| 2004/0247419 A1 | 12/2004 | Hill | |
| 2007/0126285 A1 | 6/2007 | Murakami et al. | |

FOREIGN PATENT DOCUMENTS

| | | |
|---|---|---|
| JP | 2009190507 | 8/2009 |
| WO | WO 99/49976 | 10/1999 |
| WO | WO2008/079931 | 7/2008 |

OTHER PUBLICATIONS

Combined Search and Examination Report under Sections 17 & 18(3).
Applicant: Timothy Lawlor et al; Application No. GB1203643.0; Date: Apr. 4, 2012.
International search report; PCT/ISA/210; and Written Opinion; dated Sep. 27, 2012.

* cited by examiner

*Primary Examiner* — Stephen Gordon
(74) *Attorney, Agent, or Firm* — Lackenbach Siegel, LLP

(57) ABSTRACT

A green transport system includes a bogie system having forwardly disposed and rearwardly disposed bogies in which the rearwardy disposed bogie includes a front bogie and a rear bogie interconnected to the front bogie by a telescopic beam assembly for selective incremental retractable extension so that the bogies are disposed in a plurality of transport modes for load bearing exceptionally high tonnage heavy-duty tracked equipment, particularly crushers without disassembly of the crusher; the exceptionally high tonnage crusher being transported as a single unit, with resultant fuel and energy conservation and greenhouse gas emission reduction, and the elimination of a pre-crushing operation.

12 Claims, 18 Drawing Sheets

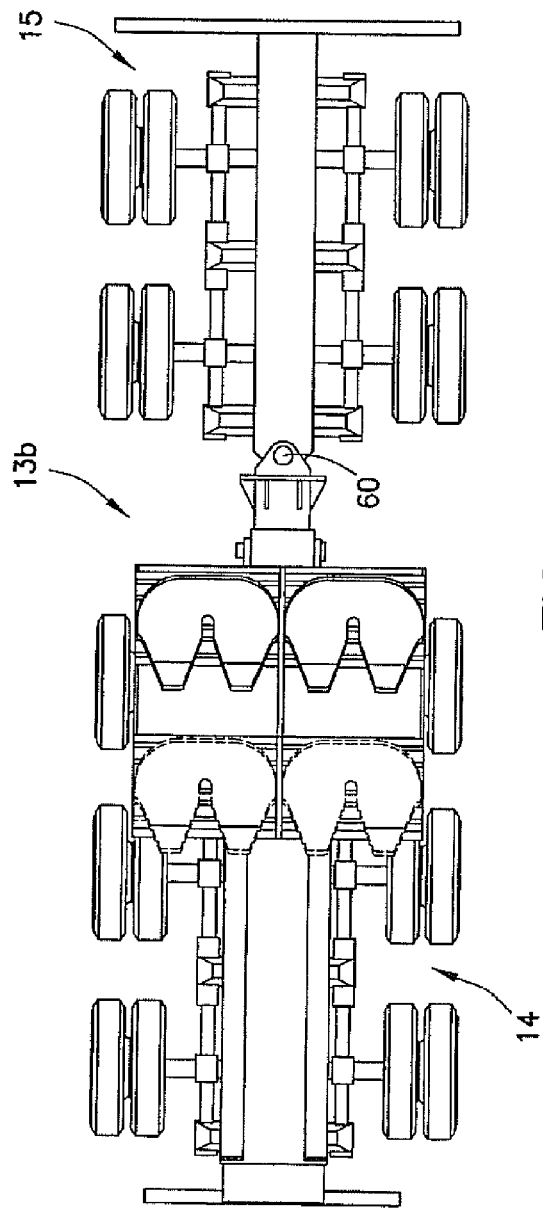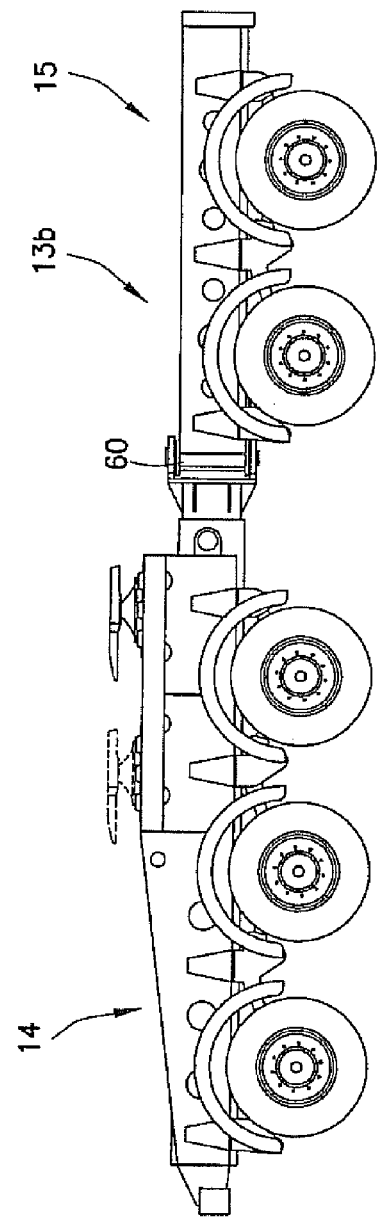

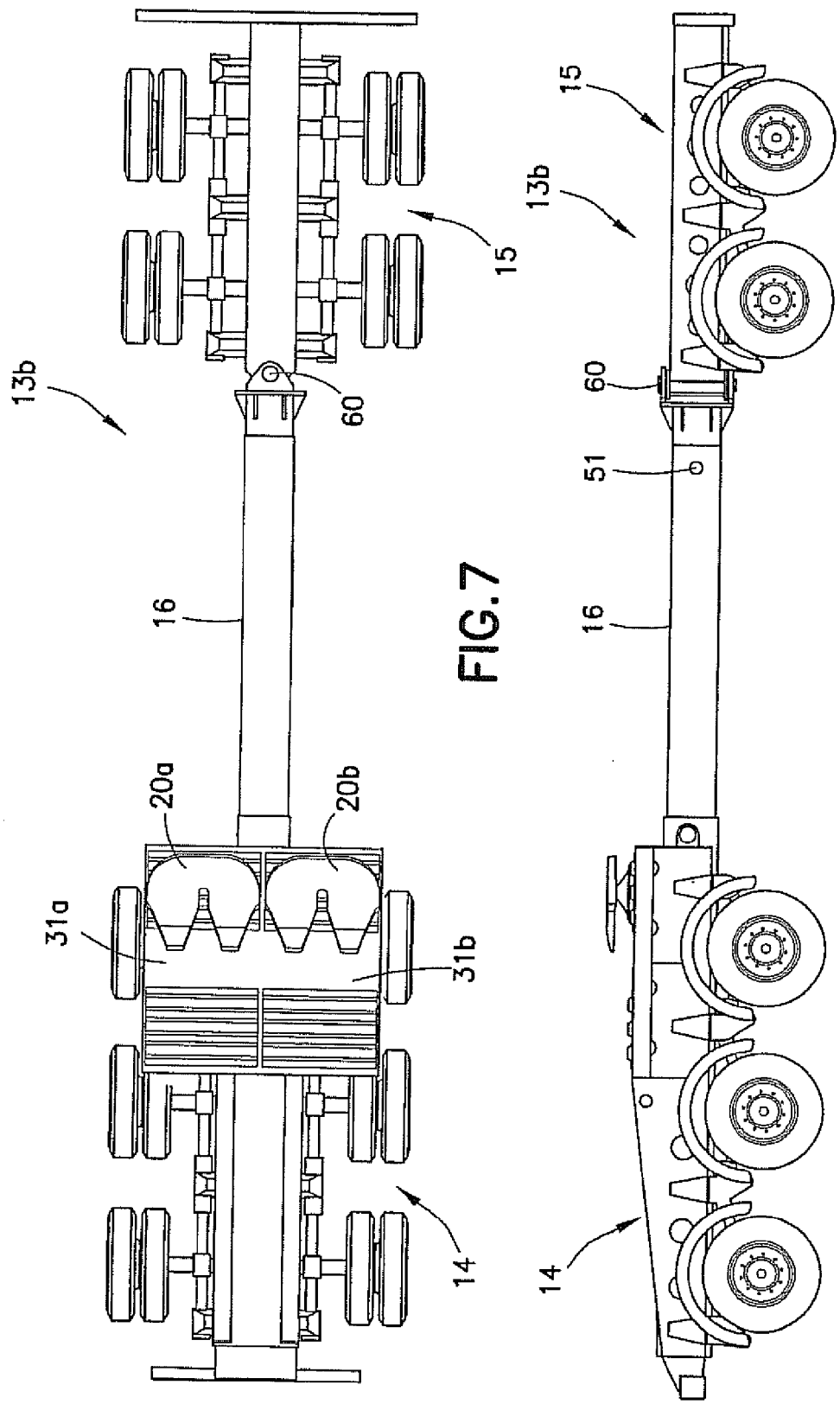

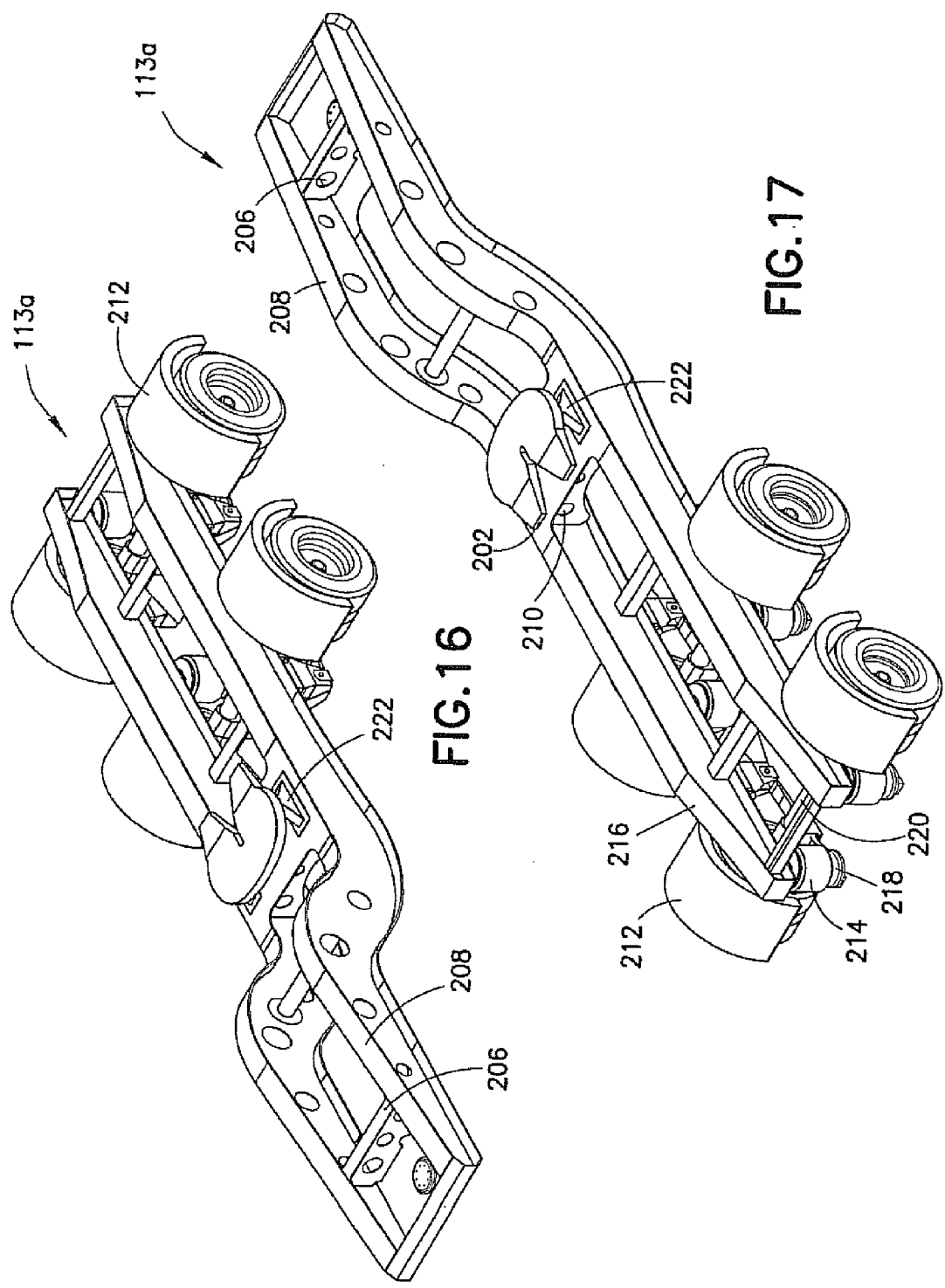

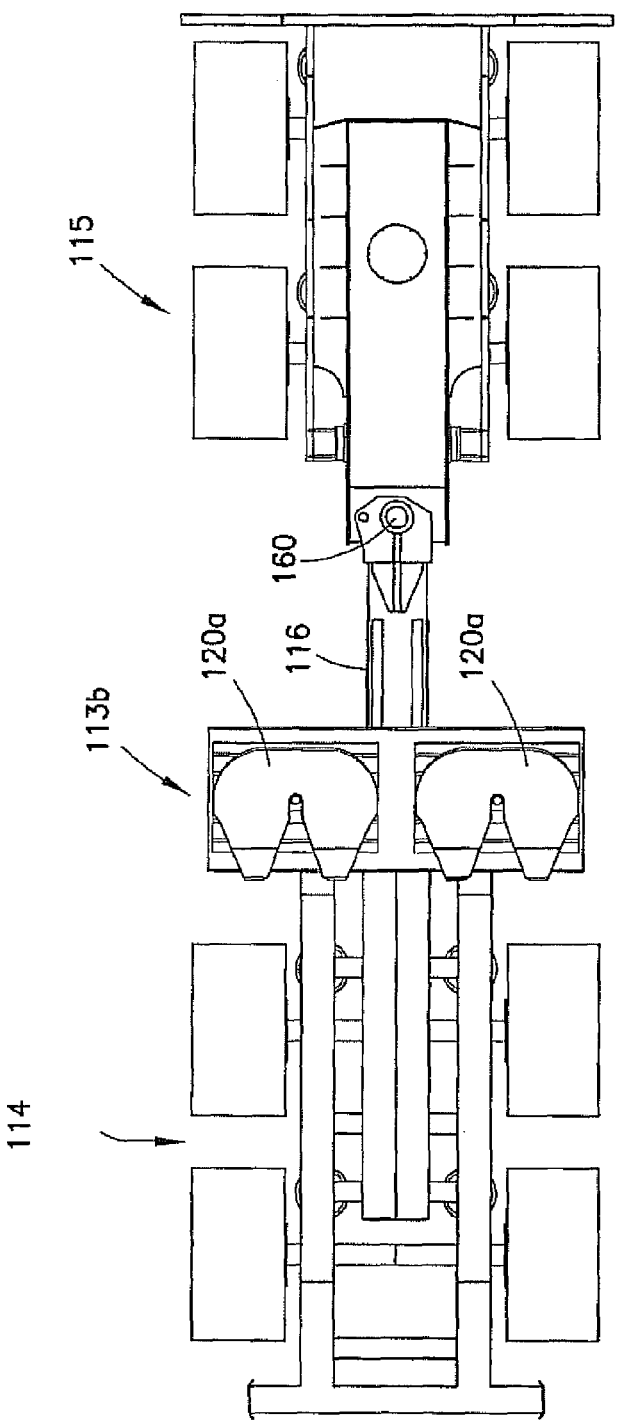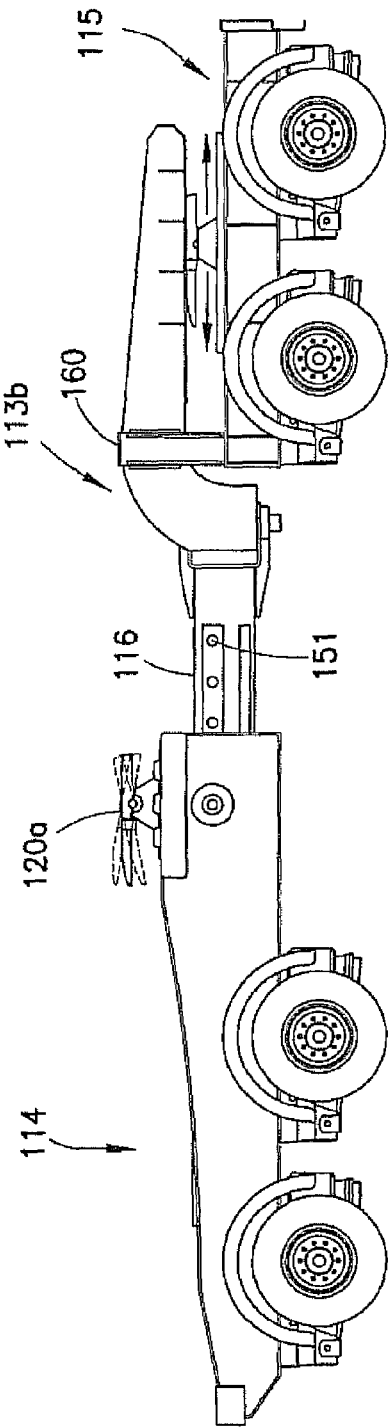

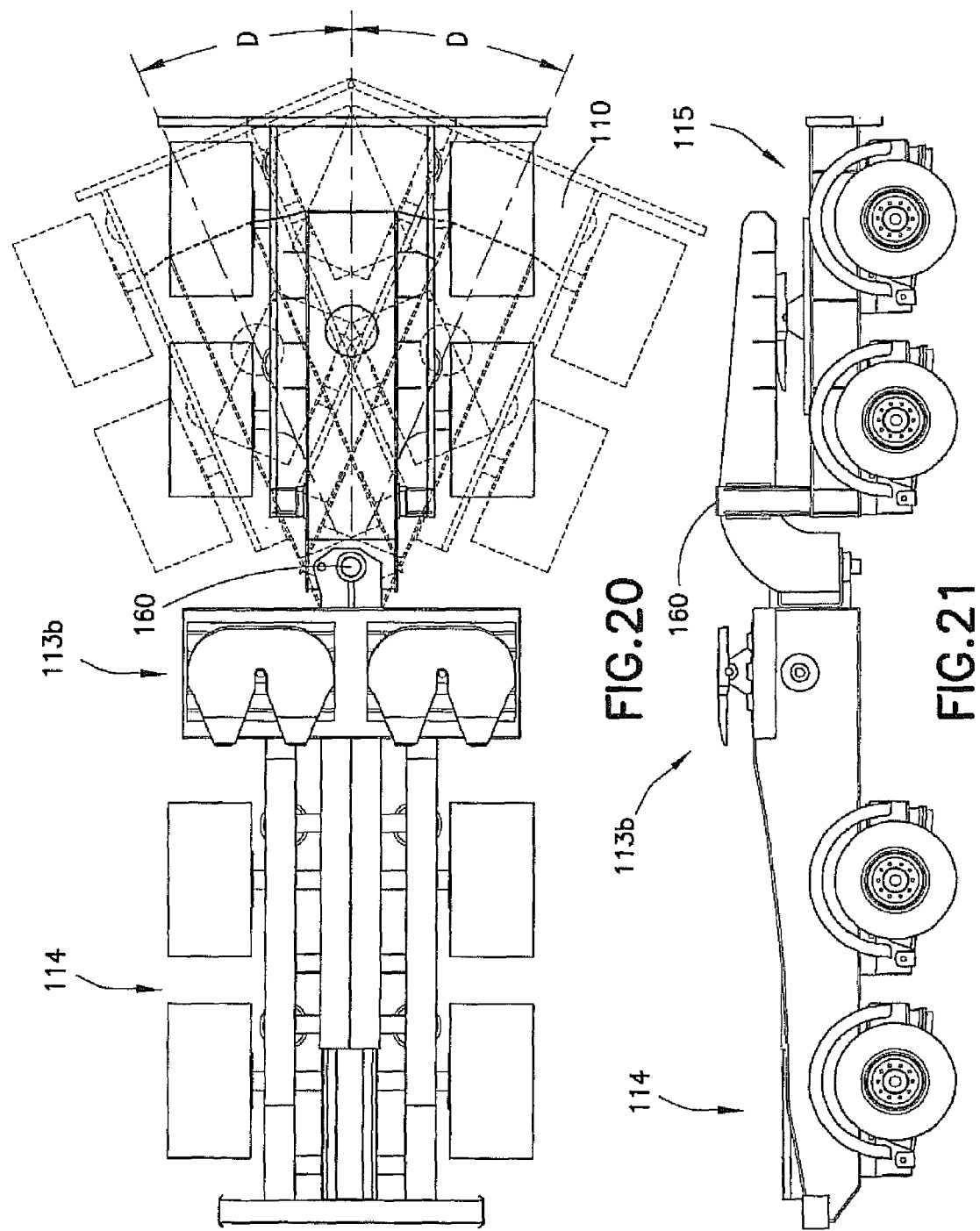

TRANSPORT SYSTEM FOR HEAVY-DUTY EQUIPMENT

PRIOR RELATED APPLICATION

This application is a non provisional application and claims priority to provisional application Ser. No. 61/453,683, filed Mar. 17, 2011, and incorporates the provisional application herein in its entirety by reference thereto.

FIELD OF THE INVENTION

This invention relates to the transport of heavy-duty equipment. This invention also relates to providing fuel and energy conservation and greenhouse gas reduction in the transport of heavy-duty equipment.

BACKGROUND OF THE INVENTION

The prior art transport is generally not capable of transporting oversized high tonnage heavy-duty units, particularly crushers and crawlers. This was in large measure because of the State and Federal Department of Transportation (DOT) load bearing limitations on roads, and the deteriorated state of the bridges. As a consequence, the prior art practice is to transport low tonnage units, or less desirably, disassemble the high tonnage heavy-duty units into sections at the depot. Then each dismantled section would be loaded onto a separate transport and separately transported to the worksite. The sections would then be reassembled at the worksite. After completion of the crushing operations at the worksite, the heavy-duty unit would be disassembled into sections and the sections then re-transported on separate transports back to the depot. The prior art system requires extensive energy and fuel consumption with excessive emissions of greenhouse gases. The prior art low tonnage units, namely crushers, could not handle large rocks that required high energy consummation in preliminary pre-breaking or pre-crushing operations. The present invention provides for greenhouse gas reduction and fuel and energy conservation in the road transport of high tonnage heavy-duty equipment. The present invention also provides for further fuel and energy reductions in eliminating pre-crushing operations.

A system for the transport of a tracked crusher or crawler is disclosed in U.S. Patent Publication 20040135344, Publication Date, Jul. 15, 2004 (Douglas I), and International Publication WO 99/49976, International Publication Date, Oct. 7, 1999 (Douglas II). Douglas I and Douglas II disclose a transport system which has limited tonnage load capabilities, is subject to shimmying, has poor load weight distribution, does not meet a broad range of Federal and State DOT regulations, and requires extensive assembly and disassembly of components in the mounting and dismounting of the tracked crusher or crawler. The prior art crusher or crawler tonnage limitation and concomitant heavy-duty limited performance in turn limited the efficiency of operations and concomitantly fuel efficiency. The present invention provides for the transport of high tonnage crushers and crawlers in a single transport mode and yet meets Federal and State DOT regulations.

SUMMARY OF THE INVENTION

The present invention, in one principal aspect, is a green system for the transport of diverse high tonnage tracked heavy-duty equipment, such as a crusher or crawler, with ready transport of the heavy-duty equipment as an intact unit from the depot to the worksite over diverse road conditions and deteriorated infrastructure while meeting diverse Federal and State DOT requirements, and yet permitting ready dismount and operation of the integral high tonnage crusher or crawler at the worksite. The present invention provides for greenhouse gas reduction and fuel savings in the ready transport of high tonnage heavy-duty equipment as a unit, and ready-site set-up at the work site with reduced downtime.

This invention, in another aspect, is a bogie system for the transport of heavy-duty equipment such as, without limitation, a crusher or crawler—type unit, by a motorized vehicle such as a tractor or jeep, and permits diverse transport modes for different units of particularly high tonnage, with even load bearing distribution of the exceptional tonnage, to meet the diverse Federal and State DOT requirements, and also overcomes the load bearing limitations because of deteriorated infrastructure, particularly including decrepit bridges.

The bogie system has forwardly disposed and rearwardly disposed bogies in which the rearwardy disposed bogie includes a front bogie and a rear or back bogie interconnected by a telescopic beam assembly for selective incremental retractable extension so that the bogies are disposed in a plurality of transport modes for the ready transport and load bearing distribution of exceptionally high tonnage heavy-duty tracked equipment, particularly crushers and crawlers. The front bogie includes a pair of track-mounted fifth wheels, so that the pair of fifth wheels is selectively longitudinally retractably extended to a desired position. The telescopic beam assembly and track-mounted fifth wheels are generally rearwardly extended commensurate with the tonnage of the heavy-duty equipment, to provide novel heavy load bearing and distribution.

The present invention reduces greenhouse gas emissions, improves environmental quality and fuel and energy in several respects, including: elimination of multiple transports of crusher compounds to a work site with concomitant savings in fuel and energy and reduction in greenhouse gas emissions; elimination of pre-crusher operations with concomitant savings in fuel and energy; reduction in greenhouse gas emissions; and improved heavy load distribution and shimmying in transport; and the reduction in further deterioration of roads and bridges. The crusher operation fuel savings alone amounts to at least 50% for the equivalent crushing tonnage and size reduction that the prior art requires particularly including a pre-crusher operation

BRIEF DESCRIPTION OF THE DRAWINGS

FIG. 4 is a top plan view of the rearwardly disposed bogie as shown in FIG. 2;

FIG. 5 is a side elevational view of the rearwardly disposed bogie as shown in FIG. 2;

FIG. 7 is a top plan view of the bogie system with the rear bogie extended away from the front bogie as shown in FIG. 6;

FIG. 8 is a side elevational view of the rearwardly disposed bogie of FIG. 6;

FIG. 16 is a front perspective view of the forwardly disposed bogie as shown in FIG. 14;

FIG. 17 is a rear perspective view of the forwardly disposed bogie as shown in FIG. 16;

FIG. 18 is a top plan view of a further embodiment of the rearwardly disposed bogie as shown in FIG. 2;

FIG. 19 is a side elevational view of the bogie as shown in FIG. 18;

FIG. 20 is a top plan view of the bogie as shown in FIG. 18 showing angular disposition of the rear bogie transport;

FIG. 21 is a side view of the rearwardly disposed bogie as shown in FIG. 18 in the rear bogie fully retracted position;

DESCRIPTION OF THE INVENTION

Figure 1:
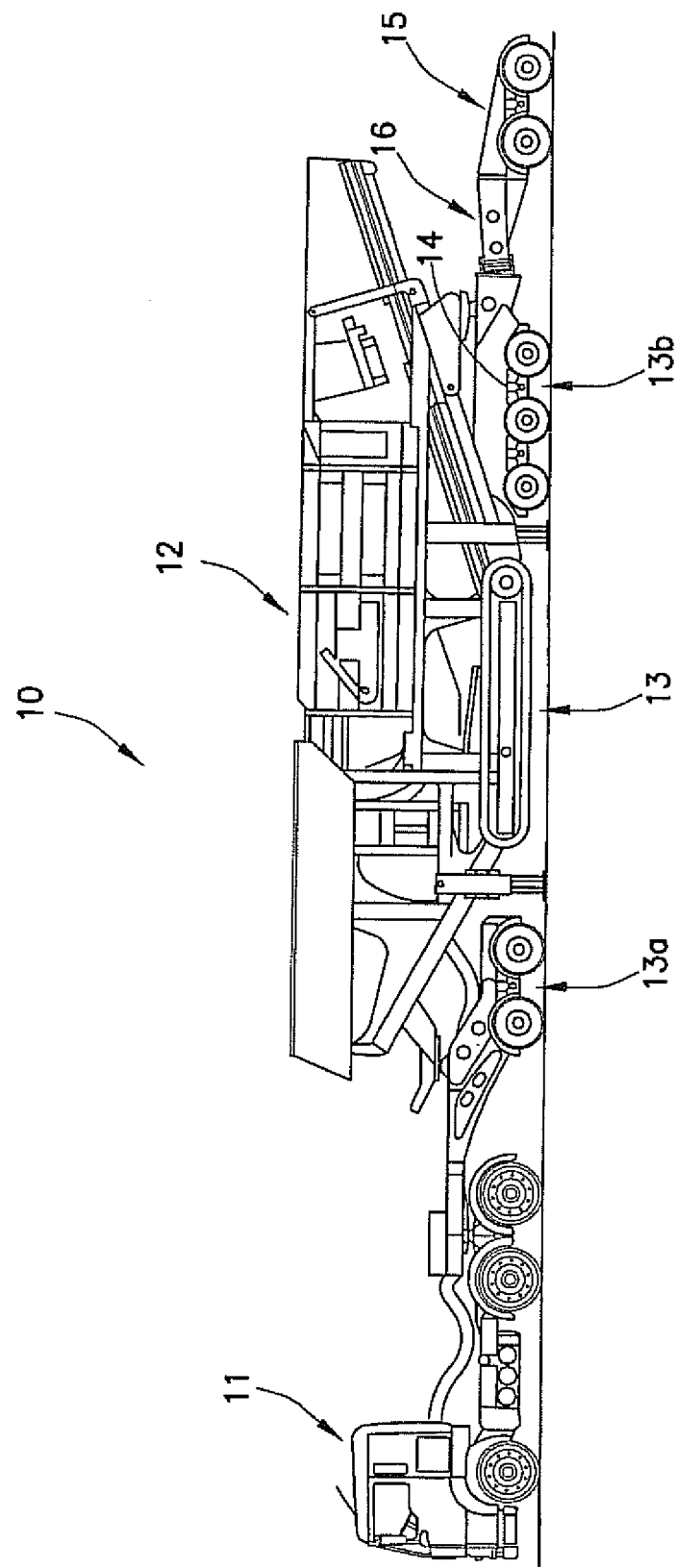
FIG. 1 is a side elevational view of the transportation system of the present invention.
Figure 2:
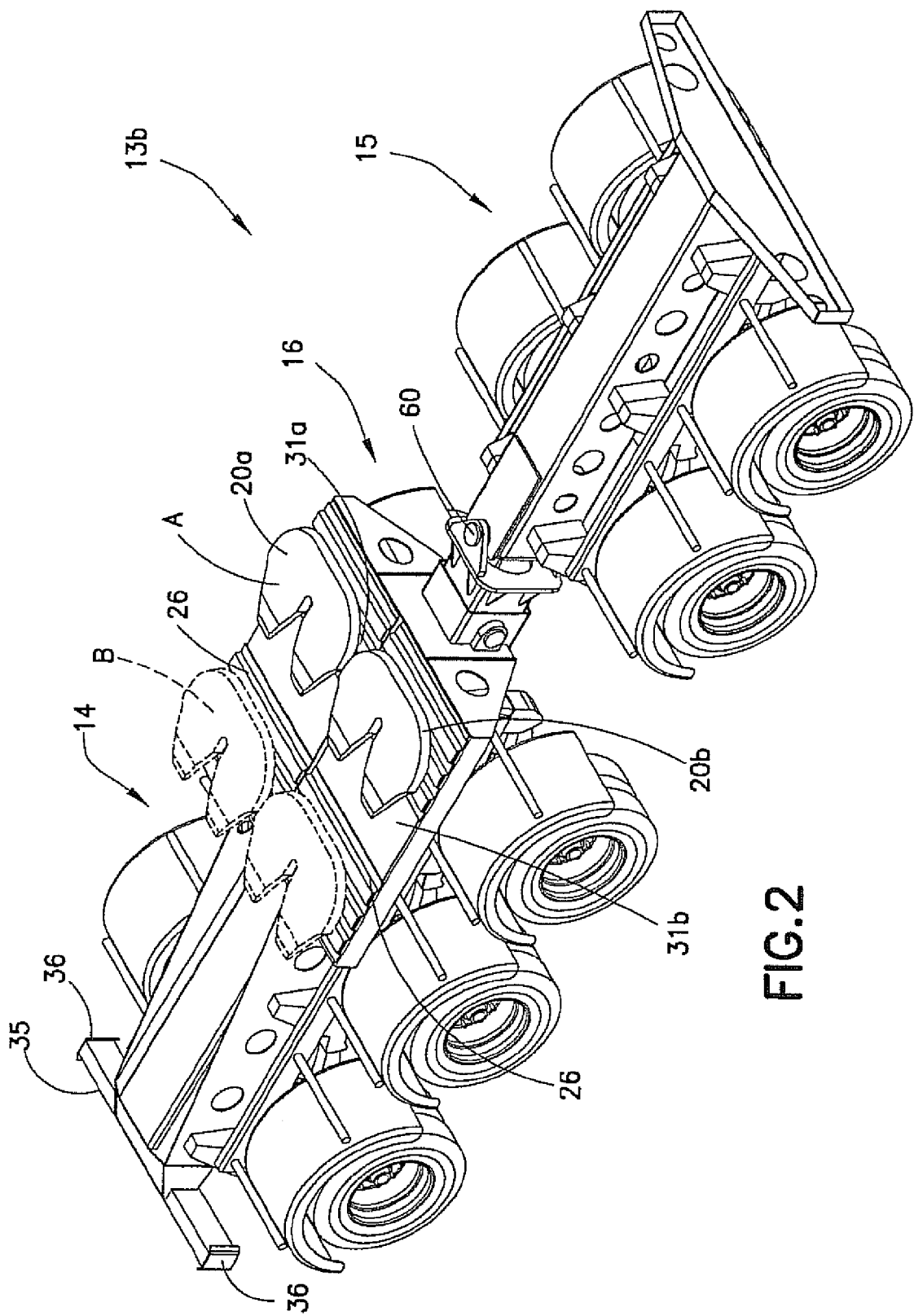
FIG. 2 is a rear perspective view of the rearwardly disposed bogie with two aligned fifth wheels in two positions, and the rear bogie disposed against the front bogie.
Figure 3:
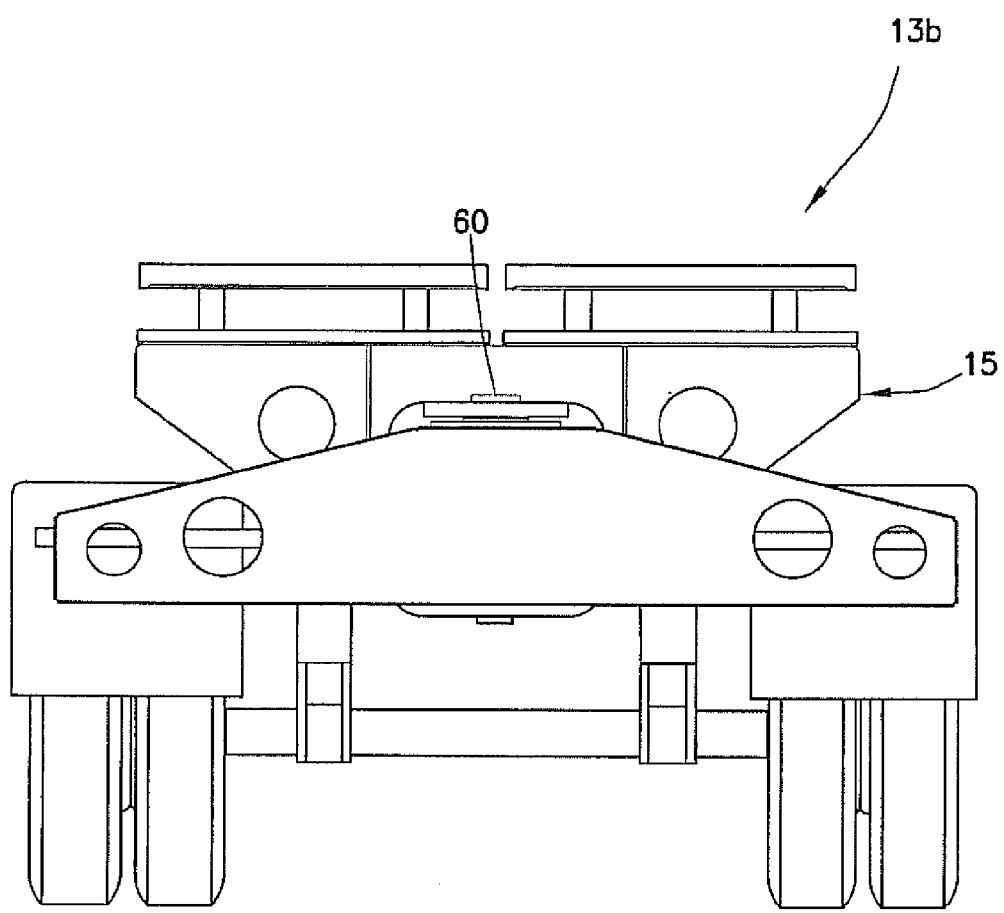
FIG. 3 is a rear elevational view of the rearwardly disposed bogie as shown in FIG. 2.
Figure 6:
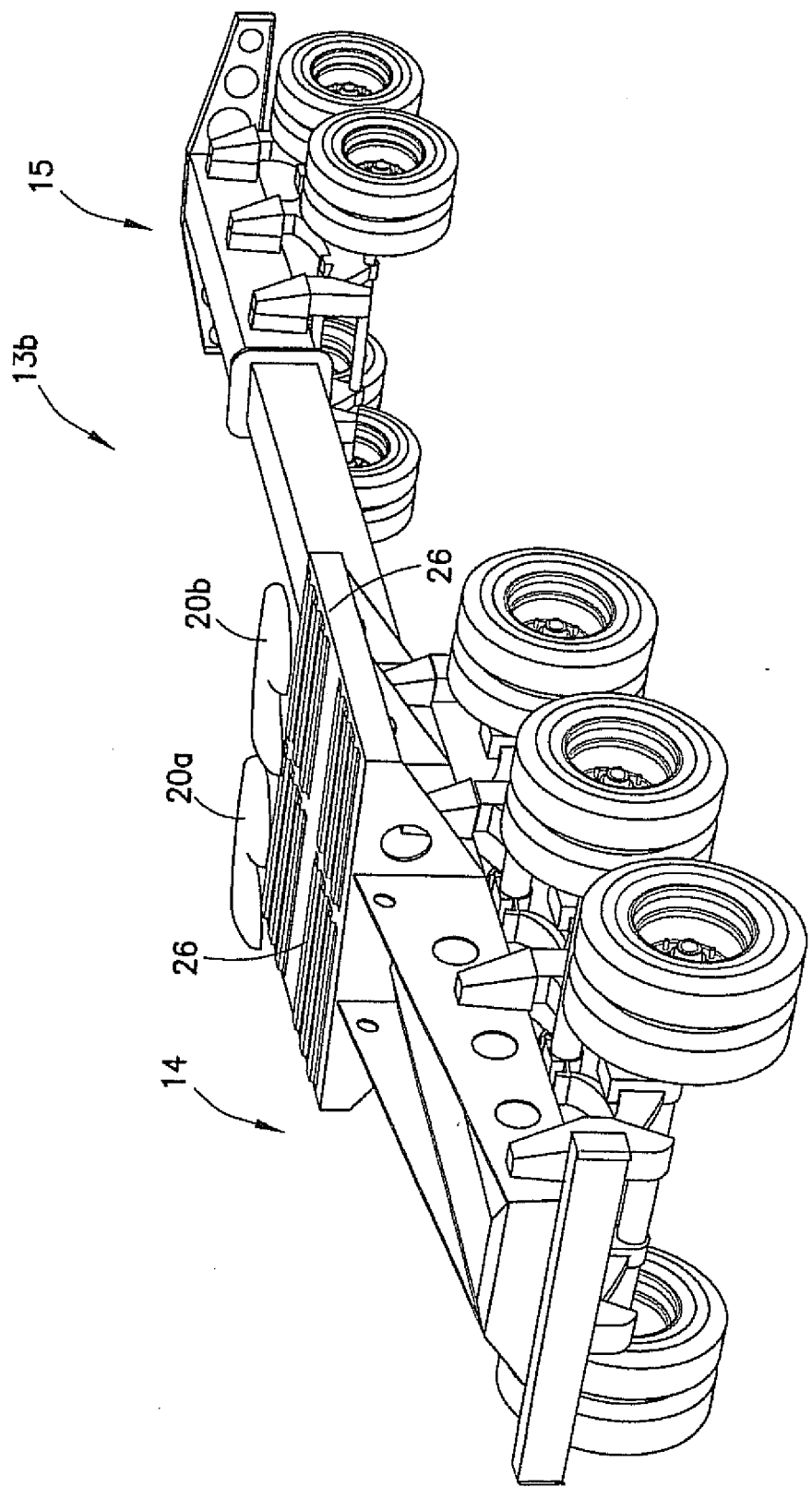
FIG. 6 is a front perspective view of the rearwardly disposed bogie with the rear bogie extended away from the front bogie.
Figure 9:
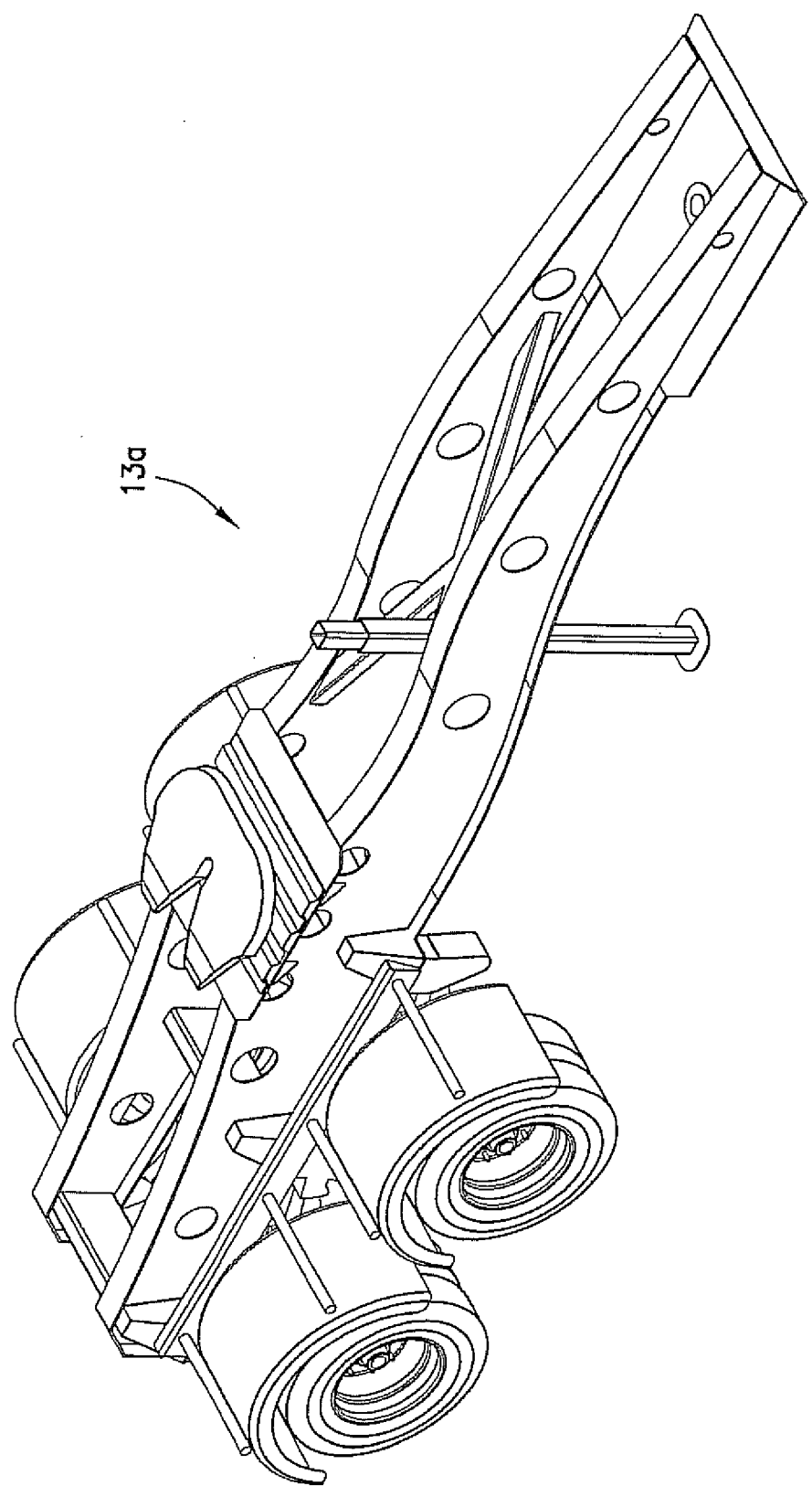
FIG. 9 is a front perspective view of the forwardly disposed bogie.
Figure 10:
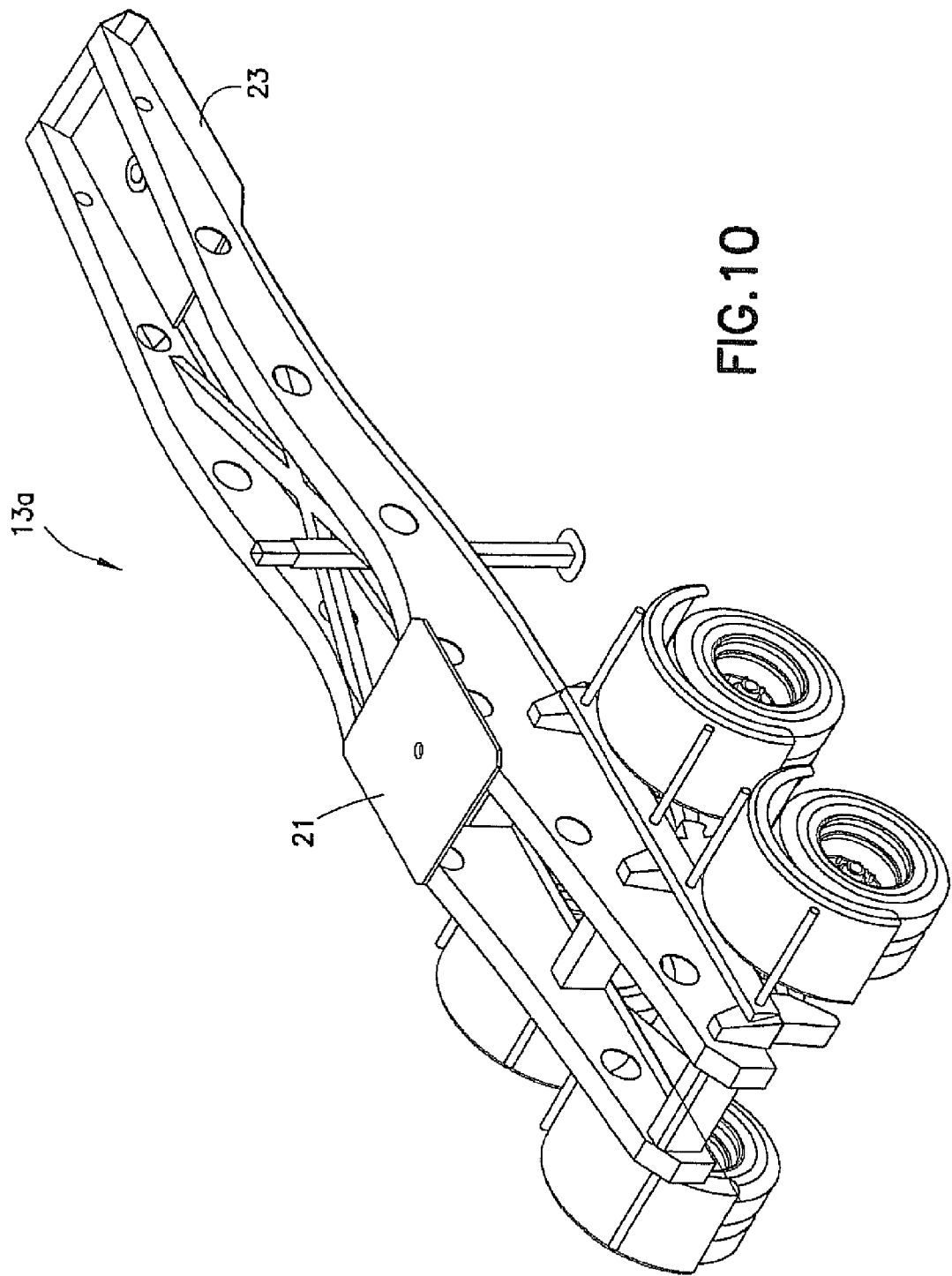
FIG. 10 is a rear perspective view of the forwardly disposed bogie of FIG. 9.
Figure 11:
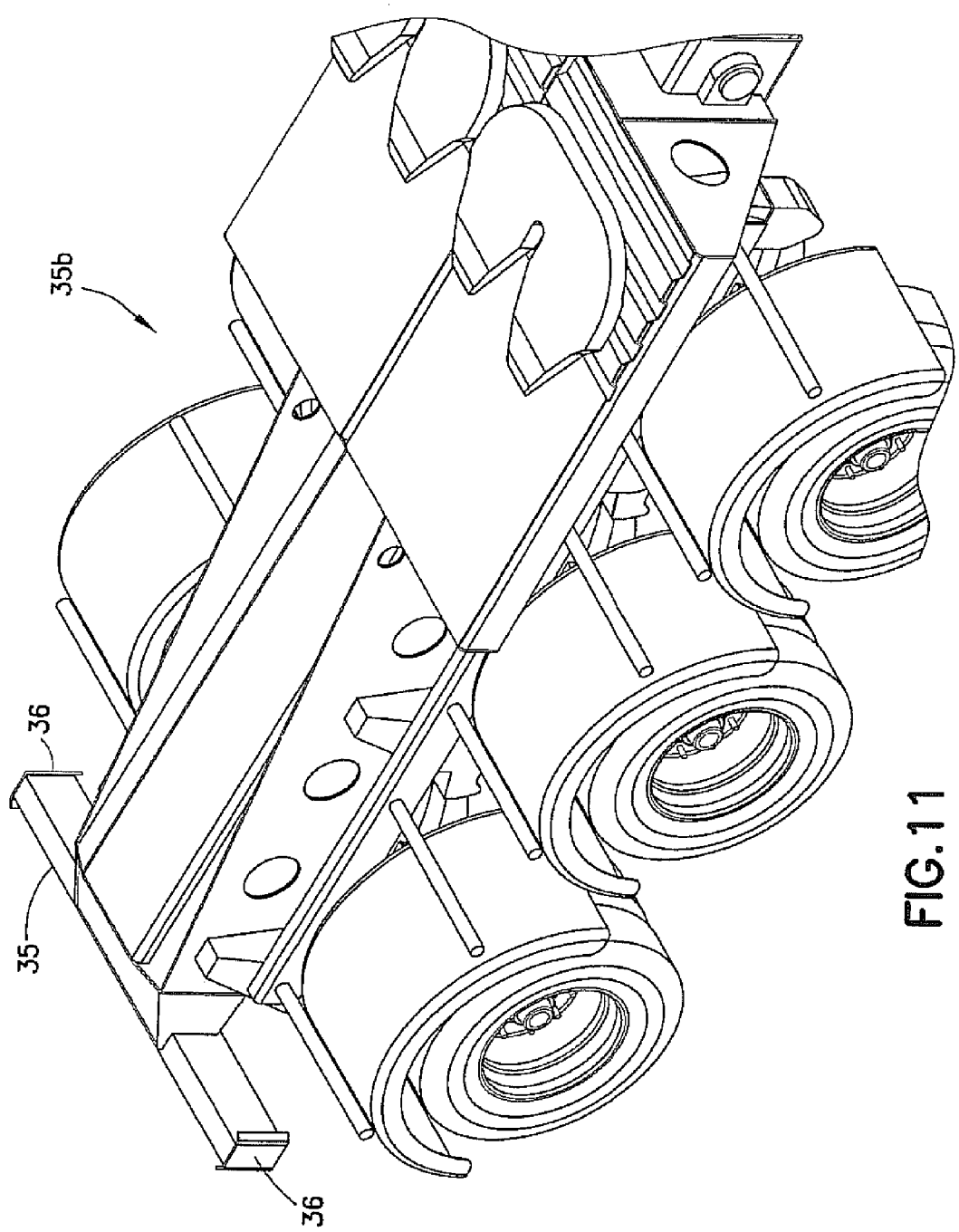
FIG. 11 is a fragmentary rear prospective view of the rearwardly disposed bogie.

Referring to the FIGS. 1-12, there is shown the transportation system of the present invention 10, which includes a tractor 11, a unit of tracked heavy-duty equipment such as a crusher 12, and a bogie system 13.

The bogie system 13 includes a forwardly disposed bogie 13a and a rearwardly disposed bogie 13b. The rearwardly disposed bogie 113b includes a front bogie 14, a rear bogie 15 and a telescopic beam assembly 16 connecting bogies 14 and 15, for selectively longitudinally retractably extending bogie 15 to a desired position and then fixing the bogies 14 and 15 in the extended position. The front bogie 14 includes a pair of aligned fifth wheels 20a and 20b which are slidably mounted on tracks 26 for selective movement to at least one of two positions.

The forwardly disposed bogie 13a includes a fifth wheel or connecting plate 22 for receiving the unit 12 connecting plate or fifth wheel 21, and further includes a forwardly disposed plate 23 for mounting on the tractor longitudinally fifth wheel 24. The crusher connecting plate 21 is mounted to assembly 30 which is non-detachably moveably mounted to the unit or crusher 12. Assembly 30 is retained as a component of the crusher 12 in all mounting and transport operations.

The rear bogie 15 is freely pivotably moveable by pivot assembly 60 with telescopic beam assembly 16 in the tractor 11 forward drive mode and pivot assembly 60 is fixedly disposed by a lock pin in the tractor 11 reverse mode.

The aligned fifth wheels 20a and 20b are selectively longitudinally movable on plates 31a, 31b, as shown in FIGS. 1, 2-5). The front bogie pair of fifth wheels 20a, 20b are disposed on plates 31a, 31b slidably disposed in facingly disposed spaced racks 26, so that the aligned plates are moved in tandem to different axially disposed positions.

The front bogie 14 includes stop bar 35 having side bumpers 36 to contactingly engage the conventional crusher channel side panels (not shown) and thereby limit the transverse movement of the front bogie. The bumper stop bar 35 when disposed in the crusher channel also limits the vertical movement of stop bar 35 and in turn the front bogie 14. In this manner of construction, the forces exerted between the rearwardly disposed bogie and the crushers are minimized while the integrity of the mounting configuration is maintained during transport.

The telescopic beam assembly 16 may be incrementally telescoped extending from the most lengthened stop pin position 51 (FIGS. 6-8) or to the most shortened stop pin length 52 so that the rear bogie is adjacent the front bogie (FIGS. 1-5). The most adjacent front and rear bogie disposition of FIGS. 1-5 is particularly used in rapid transport of the bogie system after dismount of the crusher.

Figure 12:
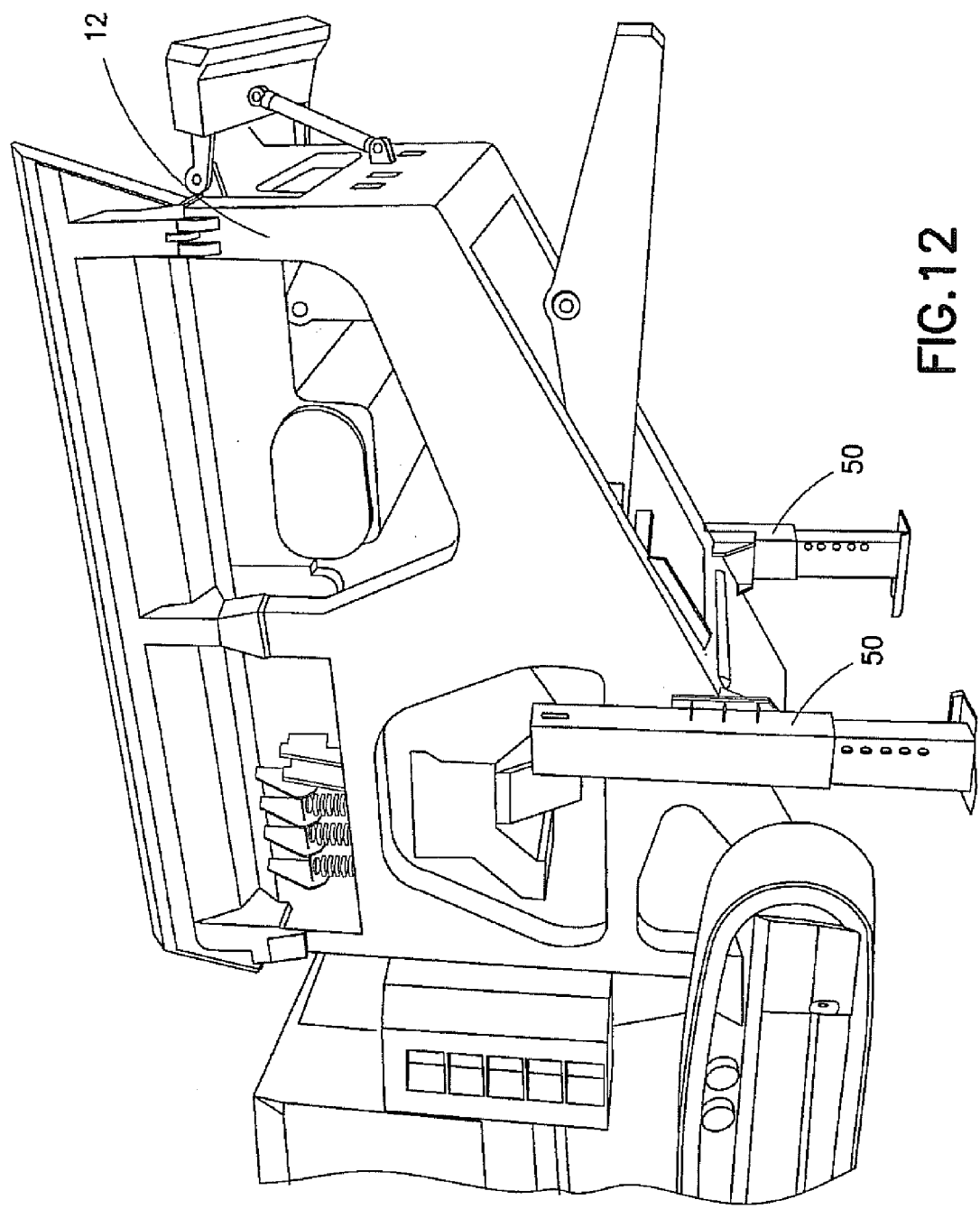
FIG. 12 is a partial perspective elevational view of the heavy-duty uni mounted for crushing.
Figure 13:
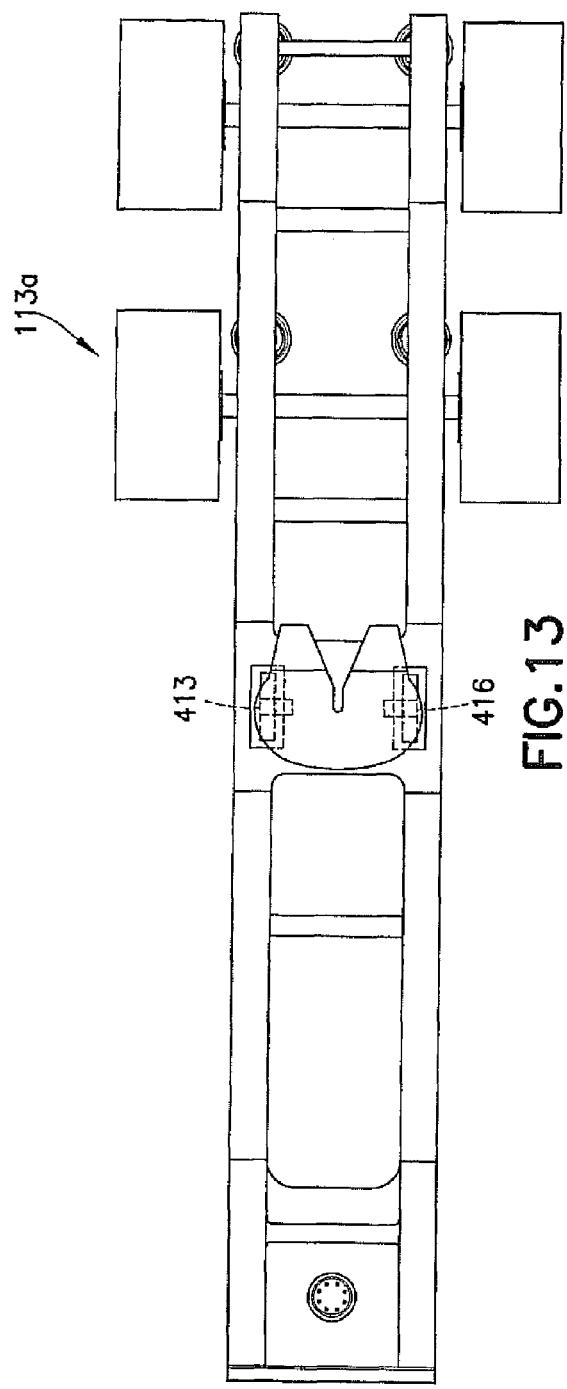
FIG. 13 is a top plan view of a further embodiment of the forwardly disposed bogie as shown in FIG. 9.
Figure 14:
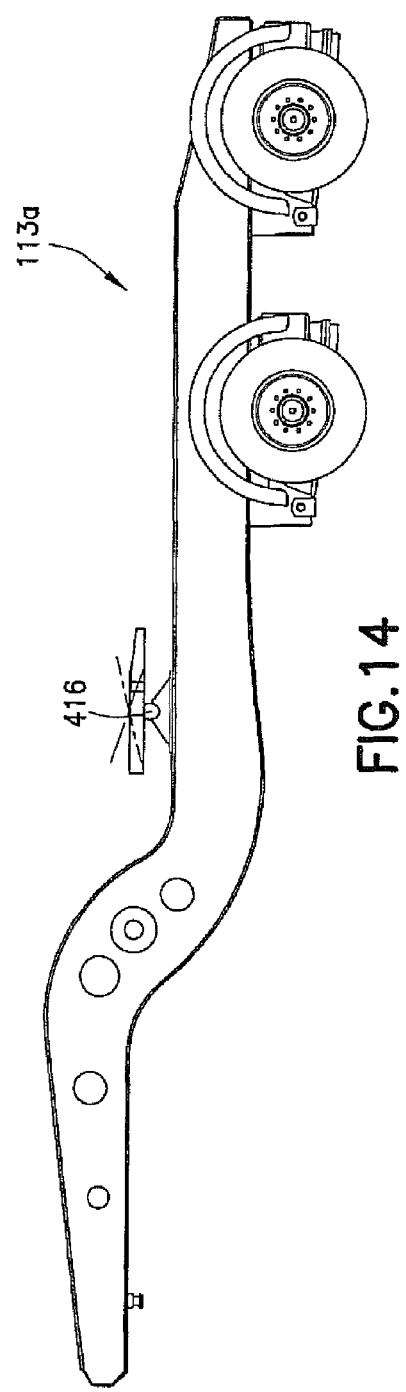
FIG. 14 is a side elevational view of the forwardly disposed bogie as shown in FIG. 13.
Figure 15:
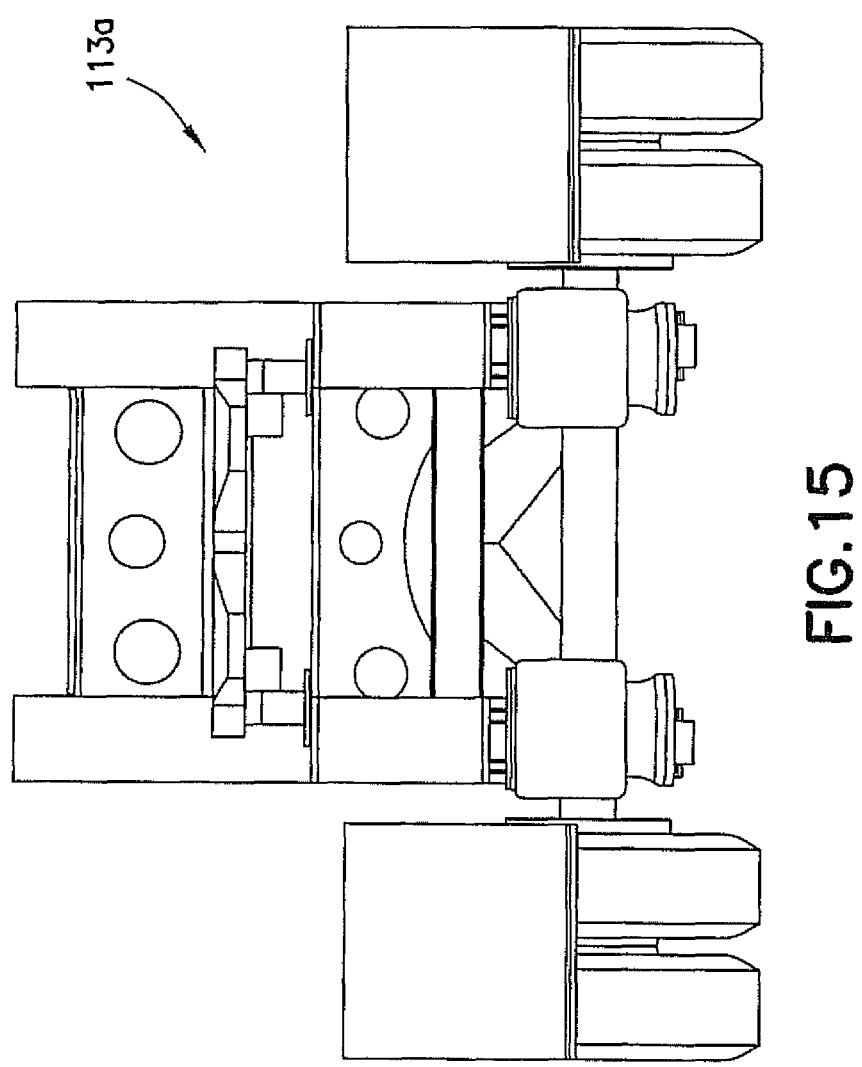
FIG. 15 is an enlarged front elevational view of the forwardly disposed bogie of FIG. 14.
Figure 22:
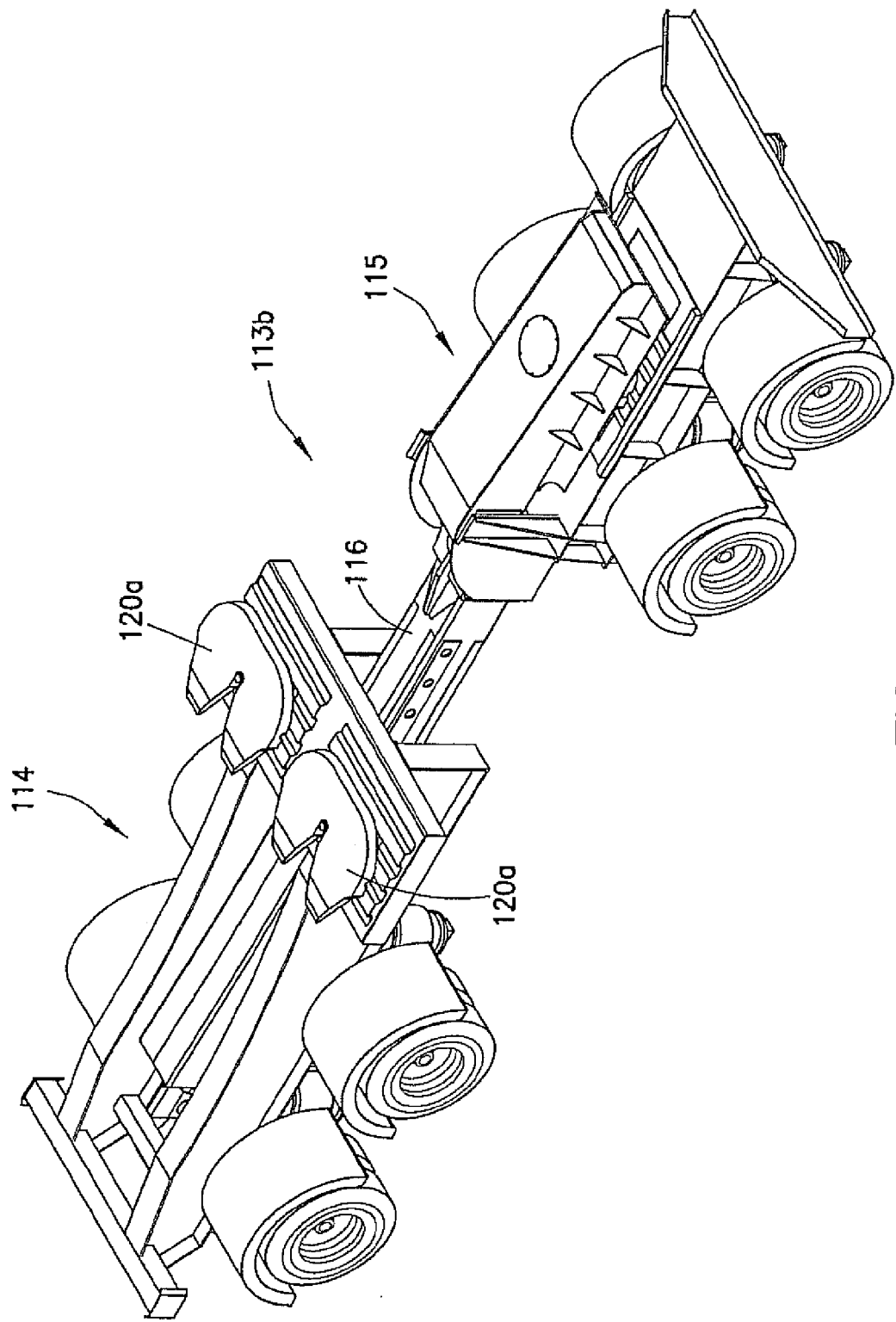
FIG. 22 is a rear perspective view of the rearwardly disposed bogie as shown in FIG. 18.
Figure 23:
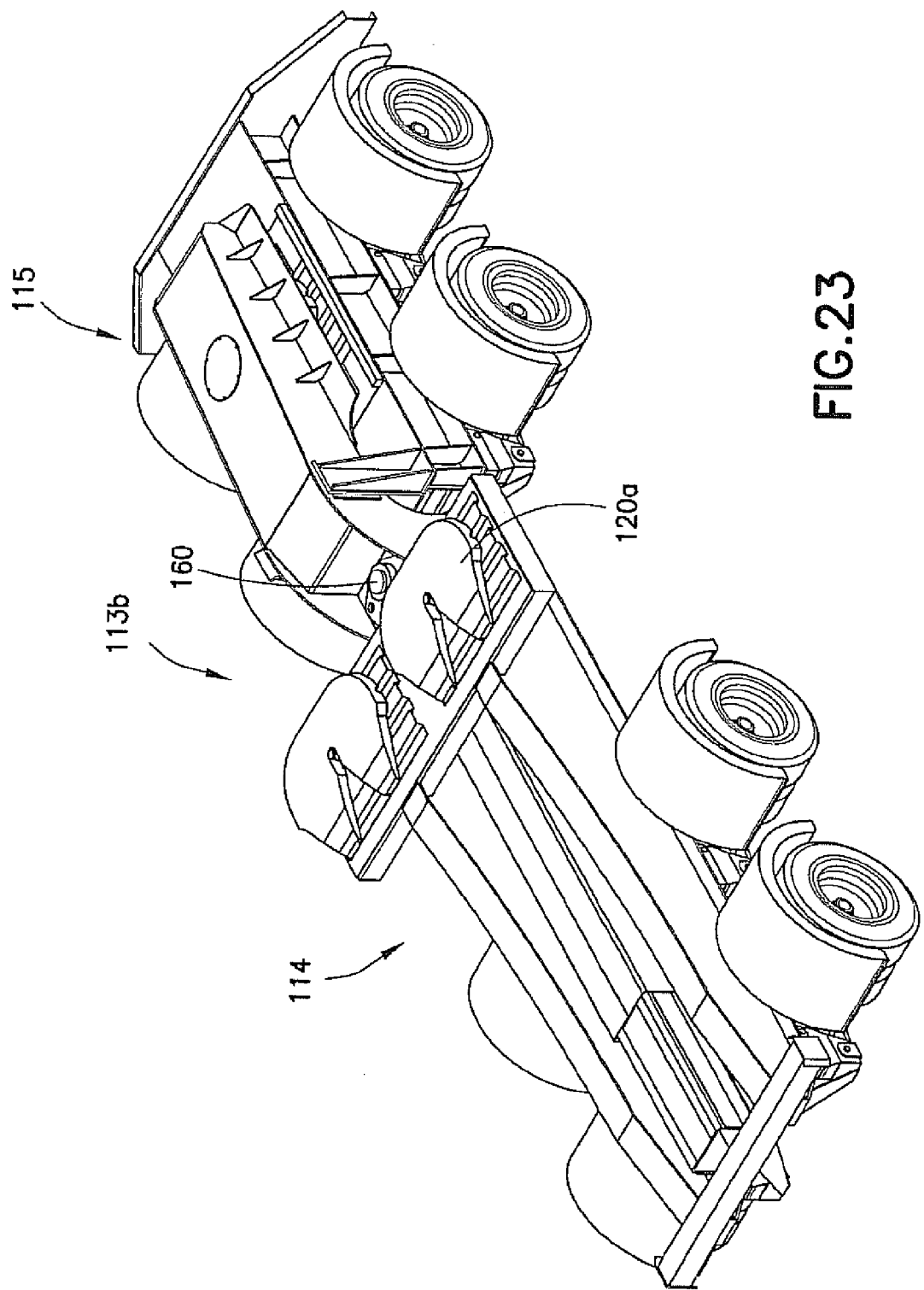
FIG. 23 is a front perspective view of the rearwardly disposed bogie as shown in FIG. 18 with the rear bogie in the fully retracted position.

The crusher 12 includes hydraulic jacks 50 (typical) which are permanently mounted as a component of the crusher as best shown in FIG. 12.

Figure 24:
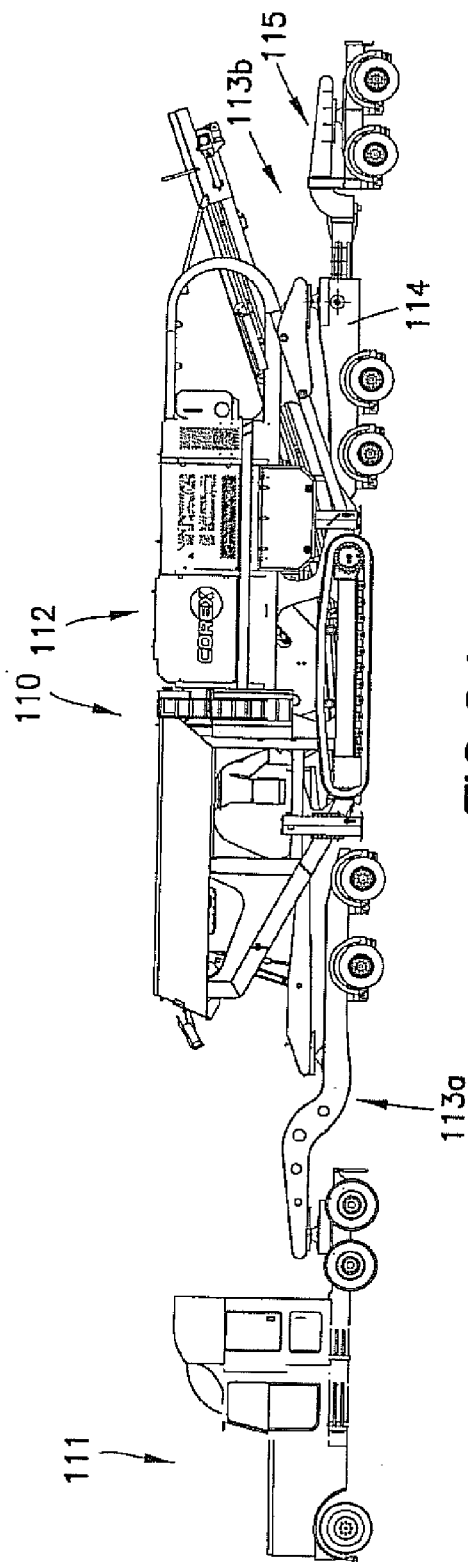
FIG. 24 is a side elevational view of a further embodiment of the transport system as shown in FIG. 1.
Figure 25:
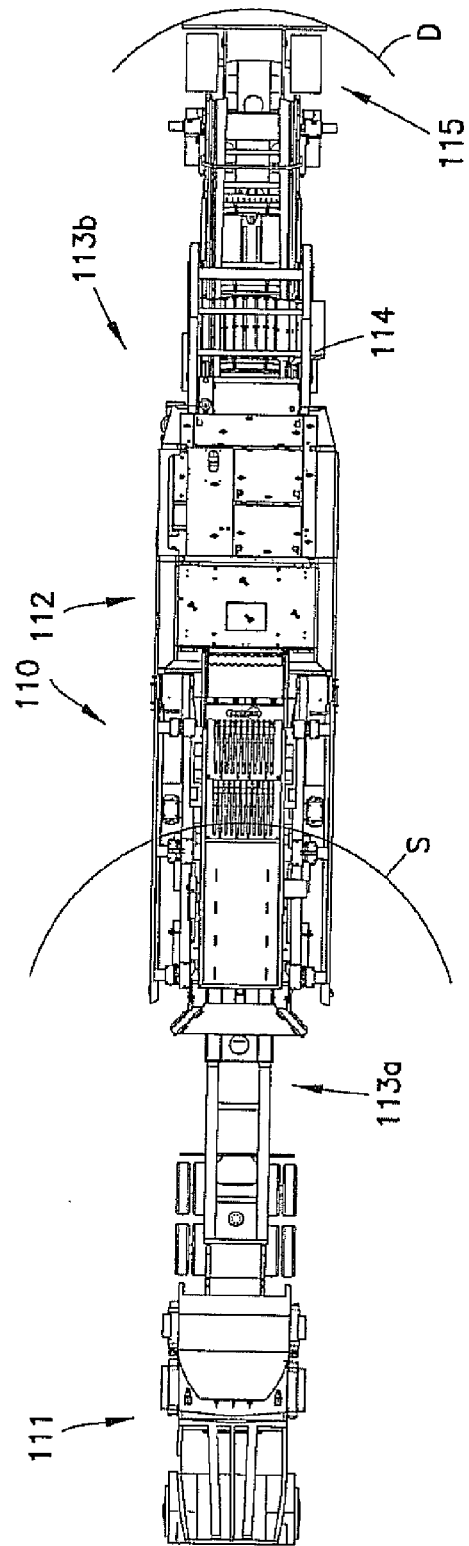
FIG. 25 is a top plan view of the transport system as shown in FIG. 24.

Referring now to the FIGS. 13-25, there is shown in alternate embodiment, namely transportation system 110, which includes a tractor or jeep 111, a unit of tracked heavy-duty equipment such as a crusher 112, and a bogie system 113. FIGS. 24-25 generally illustrate the transport system 110 for transport of a heavy-duty crusher 112 in excess of 100,000 lbs.

The bogie system 113 includes a forwardly disposed bogie 113a and a rearwardly disposed bogie 113b. The rearwardly disposed bogie 113b includes a front bogie 114, a rear bogie 115 and a telescopic beam assembly 116 connecting bogies 114 and 115, for selectively longitudinally retractably extending bogie 115 to a desired position and then fixing the bogies 114 and 115 in the extended position. The front bogie 114 includes a pair of aligned fifth wheels 120a and 120b which are slidably mounted on tracks 126 for selective movement to at least one of two positions.

The forwardly disposed bogie 113a includes a fifth wheel or connecting plate 22 for receiving the unit 112 connecting plate or fifth wheel 121, and further includes a forwardly disposed plate 123 for mounting on the tractor longitudinally fifth wheel 124. The crusher connecting plate 121 is mounted to assembly 130 which is non-detachably moveably mounted to the unit or crusher 112. Assembly 130 is retained as a component of the crusher 112 in all mounting and transport operations. It is to be understood that the terms "fifth wheel" and/or "mounting plate" as used hereinbefore and hereinafter to describe a load bearing mounting element and is not to be construed as being limited to any one such load bearing mounting element, whether characterized as a mounting plate, fifth wheel or otherwise.

The rear bogie 115 is freely pivotably moveable by pivot assembly 160 with telescopic beam assembly 116 in the tractor 111 forward drive mode, and pivot assembly 160 is fixedly disposed by a lock pin in the tractor 111 reverse mode.

The aligned fifth wheels 120a and 120b are selectively longitudinally movable on plates 131a, 131b. The front bogie pair of fifth wheels 120a, 120b is disposed on plates 131a, 131b slidably disposed in facingly disposed spaced racks 126, so that the aligned plates are moved in tandem to different axially disposed positions.

The front bogie 114 includes stop bar 135 having side bumpers 136 to contactingly engage the conventional crusher channel side panels (not shown) and thereby limit the transverse movement of the front bogie. The bumper stop bar 135 when disposed in the crusher channel also limits the vertical movement of stop bar 135 and in turn the front bogie 114. In this manner of construction, the forces exerted between the rearwardly disposed bogie and the crushers are minimized while the integrity of the mounting configuration is maintained during transport.

The telescopic beam assembly 116 may be incrementally telescoped extending from the most lengthened stop pin position 151 or to the most shortened stop pin length 152 so that the rear bogie is adjacent the front bogie. The most adjacent disposition of is particularly used in rapid transport of the bogie system after dismount of the crusher.

The crusher 112 includes hydraulic jacks which are permanently mounted as a component of the crusher (FIG. 12).

Referring specifically to FIGS. 13-17, there is shown the forwardly disposed bogie 113a. Bogie 113a includes upper frame 208 and lower frame 216. Fifth wheel 150 is pivotably mounted on supports 222 to pivot by respective pivot pins or rods pins 413 and 416. The pivotable dispositions are shown by the broken lines in FIGS. 13-14. Fifth wheel 150 is formed with angularly and rearwardly disposed recess 202. Hydraulic cylinders 214 with retractable feet 218 are supported by cross member 220 to hold the wheels, i.e. four wheels/axle, in place. The wheels are housed in fender 212.

The present bogie construction and arrangement permits diverse axle and wheel base arrangements, which in turn permit the even distribution of exceptionally high tonnage, i.e. in excess of 100,000 lbs. crusher. The crusher has a feed area of at least about 5,000 sq. in.

Referring specifically to FIG. 20, there is shown the rear bogie 115 disposed in respectively left and right pivot positions, wherein the rear bogie 115 subtends a left and right steer drag angle of about 23°.

Referring specifically to FIG. 25, there is shown transport system 110, with concomitant rear bogie 115 steer drag angles D and tractor or jeep 116 concomitant swing radius S.

COMPARATIVE EXAMPLE

The heavy-duty crusher of the present invention has a feed area of about 5,200 sq. in. The heavy-duty crusher is transported as an intact unit by the bogie system of the present invention to the worksite. The crusher, by way of example, crushes rock of from about 3 cubic feet down to minus 12 in. at the rate of 450 to 500 tons per hour over a period of about 125 to 130 hours, with a fuel consumption of about 1,000 to 1,050 gal./hr.; whereas the prior art could only transport a crusher with a feed area no greater than about 1,700 sq. in., which in turn required an on-site pre-crusher operation, consequentially effecting a greater fuel consumption for the same rock crushing operation. The present crusher has a feed area of about 5,200, which is 300% greater than the prior art crusher feed area. The single crusher transport with the elimination of the pre-crusher operation, results in a concomitant fuel savings of at least about 50%. This savings is even greater when one factors in the about 20 gal./hr. fuel consumption for the prior art excavator pre-breaking prior to crushing, for the same resultant crushing operation.

The present invention provides a plurality of transport modes for transporting diverse heavy-duty equipment as a unit without disassembly, separate sectional transport and reassembly of the heavy-duty equipment with concomitant fuel and energy conservation and greenhouse gas reduction.

What is claimed is:

1. A transport system for transporting heavy-duty equipment comprising:
    a forwardly disposed bogie;
    a rearwardly disposed bogie, said rearwardly disposed bogie comprises means for longitudinally retractably extending the rearwardly disposed bogie from a first disposition to a second disposition; and
    said bogies comprise means for supportably mounting the heavy-duty equipment;
    whereby the bogies are selectively disposed in a plurality of transport modes for transporting diverse heavy-duty equipment of at least about 100,000 lbs. as an intact unit by a tractor, without disassembly, separate sectional transport and reassembly of the heavy-duty equipment, with concomitant fuel and energy conservation and greenhouse gas reduction.

2. The transport system of claim 1, further comprising a heavy-duty tracked crusher for transport disposed on the bogies, said tracked crusher being in excess of 100,000lbs., said tracked crusher comprises a feed hopper having a feed area of about 5,200 sq. in. whereby large rocks are crushed without pre-crushing as in conventional tracked crushers with resultant fuel conservation of at least 50% for an equivalent crushing tonnage and size reduction that is required in a pre-crusher operation.

3. The transport system of claim 1, said forwardly disposed bogie comprises means for mounting the heavy-duty equipment comprising a fifth wheel or plate for mounting the heavy-duty equipment, and said forwardly disposed bogie further comprises a plate or fifth wheel for connecting the forwardly disposed bogie to a tractor fifth wheel.

4. The transport system of claim 1, wherein the rearwardly disposed bogie comprises means for supportably mounting the heavy-duty equipment comprising two fifth wheels and wherein the two fifth wheels are slidably longitudinally disposed in first and second positions.

5. The transport system of claim 1, said rearwardly disposed bogie comprises a longitudinal axis, and two fifth wheels being aligned and rectilinearly disposed with the longitudinal axis in each of first and second positions, further comprising a heavy-duty tracked crusher for transport disposed on the bogies, said tracked crusher comprises a feed hopper having a feed area of about 5,200 sq. in. and is at least about 300% greater than the feed area of a conventional tracked crusher, whereby large rocks are crushed without pre-crushing as in conventional tracked crushers with resultant fuel conservation of at least 50% for an equivalent crushing tonnage and size reduction that is required in a pre-crusher operation, said tracked crusher being in excess of 100,000 lbs.

6. The transport system of claim 1, said means for longitudinally retractably extending the rear bogie comprises means for selectively incrementally fixing the retractably extended rear bogie in a plurality of positions.

7. The transport system of claim 1, wherein the rearwardly disposed bogie comprises a front bogie and a rear bogie connected by the means for longitudinally retractably extending the rearwardly disposed bogie so that the rear bogie is differently disposed from the front bogie in a plurality of positions.

8. The transport system of claim 7, said means for longitudinally retractably extending the rearwardly disposed bogie comprises a telescopically disposed beam, and further comprising means for incrementally fixing the beam in a plurality of positions.

9. The transport system of claim 1, wherein the means for supportably mounting the heavy-duty equipment comprises two fifth wheels, and wherein the two fifth wheels are readily disposed in fifth wheels first and second positions.

10. The transport system of claim 9, said rearwardly disposed bogie comprises a longitudinal axis, and said two fifth wheels being aligned and rectilinearly disposed with the longitudinal axis in each of the fifth wheels first and second positions.

11. The transport system of claim 10, said heavy-duty equipment comprises a channel, a front bogie of said rearwardly disposed bogie comprises a transversely disposed stop bar for front bogie limited motion disposition within a channel of the heavy-duty equipment.

12. The transport system of claim 1, further comprising a heavy-duty tracked crusher for transport disposed on the bogies, said tracked crusher comprises a feed hopper having a feed area of about 5,200 sq. in. and is at least about 300% greater than the feed area of a conventional tracked crusher, whereby large rocks are crushed without pre-crushing as in conventional tracked crushers with resultant fuel conservation of 50% for an equivalent crushing tonnage and size reduction that is required in a pre-crusher operation.

\* \* \* \* \*